US007008585B2

(12) United States Patent
Romanello

(10) Patent No.: US 7,008,585 B2
(45) Date of Patent: Mar. 7, 2006

(54) MECHANISM FOR MAKING OPENINGS IN PLASTIC PARTS WITHIN A MOLD TOOL

(75) Inventor: Tony Romanello, Windsor (CA)

(73) Assignee: Build A Mold Limited, Windsor (CA)

( * ) Notice: Subject to any disclaimer, the term of this patent is extended or adjusted under 35 U.S.C. 154(b) by 17 days.

(21) Appl. No.: 10/117,536

(22) Filed: Apr. 5, 2002

(65) Prior Publication Data
US 2002/0155190 A1   Oct. 24, 2002

Related U.S. Application Data

(60) Provisional application No. 60/281,866, filed on Apr. 5, 2001.

(51) Int. Cl.
    *B29C 45/38*  (2006.01)
(52) U.S. Cl. .............. 264/155; 264/328.9; 264/328.11; 425/577; 425/595
(58) Field of Classification Search ................ 264/155, 264/328.11, 328.9; 425/554, 553, 577, 595
    See application file for complete search history.

(56) References Cited

U.S. PATENT DOCUMENTS

| 3,649,728 | A |   | 3/1972  | Honsho et al. |
|-----------|---|---|---------|---------------|
| 4,085,178 | A | * | 4/1978  | McNeely et al. ............ 264/106 |
| 4,242,786 | A | * | 1/1981  | Pappalardo ................... 29/416 |
| 4,342,549 | A |   | 8/1982  | Lemelson |
| 4,466,934 | A | * | 8/1984  | Cane et al. .................. 264/106 |
| 5,253,997 | A | * | 10/1993 | Kamada ...................... 425/556 |
| 5,346,659 | A | * | 9/1994  | Buhler et al. .................. 264/68 |
| 5,603,882 | A | * | 2/1997  | Takano et al. .............. 264/155 |
| 5,980,809 | A | * | 11/1999 | Crain et al. .................. 264/318 |
| 6,375,891 | B1| * | 4/2002  | Nishikawa et al. ......... 264/534 |

FOREIGN PATENT DOCUMENTS

| DE | 31 35 258  | 10/1982 |
|----|------------|---------|
| JP | 58 107321  | 6/1983  |

* cited by examiner

*Primary Examiner*—Michael P. Colaianni
*Assistant Examiner*—Monica A. Fontaine
(74) *Attorney, Agent, or Firm*—Carlson, Gaskey & Olds

(57) ABSTRACT

An assembly disposed within a mold for forming openings in a plastic part includes a punch pin and a backing pin having faces disposed flush with a surface of a mold cavity. The backing pin is disposed opposite the punch pin. The punch pin is driven into the completed plastic part removing material to form an opening. The waste material is driven into a bore housing the backing pin. The backing pin recedes into the bore to accept the waste material. Upon ejection of the plastic part the waste material ejects from the mold cavity as the backing pin moves back to a position flush with the surface of the mold cavity.

16 Claims, 3 Drawing Sheets

MECHANISM FOR MAKING OPENINGS IN PLASTIC PARTS WITHIN A MOLD TOOL

This application claims priority to provisional application Ser. No. 60/281,866 filed Apr. 5, 2001.

BACKGROUND OF THE INVENTION

The invention relates to a mechanism for forming an opening in a plastic part within a mold tool before removal of the plastic part from the mold tool.

Typically, holes or openings are made in plastic parts by a core pin inserted into a cavity of the mold during the molding operation. Plastic injected into the mold will flow around the core pin forming the opening. After the plastic has solidified, the core pin is retracted from the inner cavity of the mold to allow the completed part to be removed from the mold tool.

This method of forming holes or openings is problematic for certain plastic materials and molding conditions. Plastic flowing around the core pin forms a knit line. The knit line is a term of art referring to a seam or inconsistency in the plastic part caused by two fronts of plastic failing to completely mix before the plastic solidifies. The molten plastic material flowing around the core pin forms two fronts. These fronts of plastic flow may begin to solidify before merging with each other on the opposite side of the core pin. This phenomenon creates knit lines that cause poor aesthetic appearance and weak points in the completed plastic part.

Another typical method of forming openings in plastic molded parts is byway of secondary boring or drilling operations. This is accomplished by removing the part from the mold and transporting the part to another workstation where the openings are machined into the plastic part. As appreciated, machining the opening or holes is an expensive and time-consuming process that increases the cost of the finished product.

Accordingly, it is desirable to develop an apparatus and method for forming opening within molded parts without additional machining process while minimizing formation of weak points within a molded part.

SUMMARY OF THE INVENTION

An embodiment of this invention is an assembly for forming openings in a plastic part before removal from a mold tool.

The mold tool includes upper and lower sections. A plastic part is formed by injection of molten plastic into a cavity formed between the upper and lower sections of the mold tool. A backing pin disposed in a bore of the mold includes a face positioned flush with a surface of the mold cavity. The backing pin is held in place against pressure of the plastic during molding by a holder pin actuated by a locking assembly. The locking assembly moves the holder pin between an unlocked position in which the backer pin may be pushed back into the bore and a locked position that prevents movement of the backing pin.

A cylinder actuates a punch pin driven into the plastic part forming the desired opening. Once the plastic part has solidified, the locking assembly moves to an unlocked position. The cylinder drives the punch pin into the plastic part forming the opening. The unlocked backing pin is free to slide back into the bore. As the punch pin drives through the plastic part, the material removed by the punch pin is driven back into the bore. The material remains in the bore. Once the opening is formed, the punch pin retracts out of the cavity. An ejection mechanism ejects the plastic part from the mold. The ejection mechanism pushes the backing pin outward to eject the waste material from the mold.

In another embodiment of this invention, a driving rod moved by an actuator actuates the backing pin. The backing pin slides within a keyway of the driving rod. The keyway is ramped up and back such that the backing pin slides into the bore and away from the surface of the cavity when the driving rod is moved downward. The actuator moves the driving rod relative to the mold, pulling the driving rod down, which in turn pulls the backing pin back within the bore and away from the surface of the mold cavity. The resulting opening accepts the waste material removed from the plastic part until ejected from the mold tool.

This invention provides an apparatus and method for forming openings within molded parts without forming knit lines and without additional machining processes.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
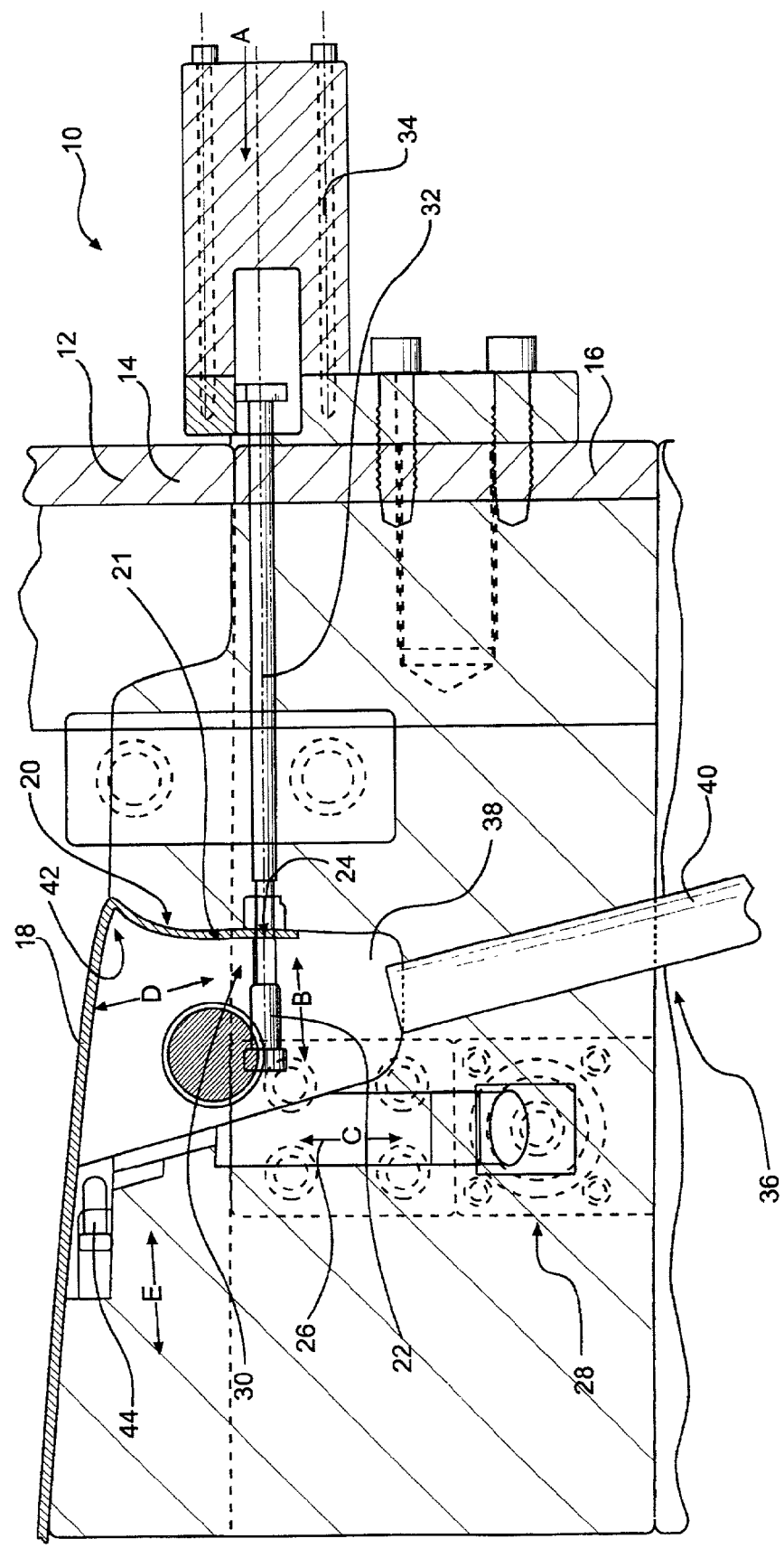
FIG. 1 is a plan view of a mold having the hole mechanism.

An embodiment of this invention is an assembly 10 disposed in a mold tool 12 having upper and lower sections 14, 16. The upper and lower sections 14, 16 cooperate to form a cavity 20. The upper and lower sections 14, 16 open and close with movement in a first pull direction perpendicular to the parting line. Plastic injected into the cavity 20 forms part 18. The assembly 10 includes a backing pin 22 disposed in a bore 30 of mold 12. The backing pin includes a face 24 positioned flush with a surface 21 of the mold cavity 20. The backing pin 22 moves in a direction different than movement of the upper and lower sections 14, 16. Movement of the backing pin within the bore 30 is in a second direction different indicated by arrows B that is different than the first pull direction. The backing pin 22 moves within the bore 30 between locked and unlocked positions. A holder pin 26 locks the backing pin 22 in the locked position against pressure of the plastic during molding. A locking assembly 28 moves the holder pin 26 to lock or free the backing pin 22. In the unlocked position, the backing pin 22 may be pushed back into the bore 30. In the locked position, the face of the backing pin 22 remains flush with a surface of the cavity 21.

A punch cylinder 34 actuates a punch pin 32 driven into the plastic part 18. The punch pin 32 moves in a direction A that is different than the first pull direction. Preferably, the punch cylinder 34 operates pneumatically, however, it is within the contemplation of this invention the punch cylinder operate hydraulically. The punch pin 32 forms the desired opening or hole. The opening may be of any configuration required for the specific application such as a hole, slot, etc. It is within the contemplation of this invention that the opening may be of any configuration required by the specific application. Further, the shape of the punch pin 32 will correspond to the desired shape of the opening in the plastic part 18.

Once the plastic part 18 has solidified, the locking assembly 28 retracts, unlocking the backing pin 22. The punch cylinder 34 drives the punch pin 32 through the plastic part 18, forming the opening. Because the locking assembly 28 is in an unlocked position, the backing pin 22 freely slides back into the bore 30 to accept material removed from the plastic part 18. The material removed from the plastic part is driven back into the bore 30 and remains in the in the bore 30. Once the opening is formed, the punch pin 32 retracts out of the cavity 20. A part ejection mechanism 36 removes the plastic part 18 from the mold 12. The part ejection mechanism 36 includes an ejection head 38 attached to an ejection rod 40. The ejection head 38 moves in a direction D that is different than the first pull direction to eject the plastic part 18.

Referring to FIG. 1, the plastic part 18 of this embodiment includes an under cut 42. To eject the part 18 from the mold the ejector head 38 is driven upward and rearward by the ejector rod 40. The backing pin 22 moves with the ejection head 38 and lines up with an ejection pin 44. The ejection pin 44 pushes the backing pin 22 outward to eject the waste material from the mold 10. Upon removal of the plastic part 18, the ejection rod 40 retracts, pulling the ejection head 38 back to a molding position. Note that any ejection mechanism known to a worker in the art is within the contemplation of this invention. The specific configuration of the ejection mechanism is application specific and a worker skilled within the art would understand that modifications for specific parts are within the scope of this invention.

Referring to FIG. 2–6, another embodiment of the locking assembly 48 includes a backing pin 46 actuated by a driving rod 48 that moves the backing pin 46 between the locked and unlocked positions in the second direction indicated by arrows B. The backing pin 46 is slidably connected within a keyway 50 of the driving rod 48. The keyway 50 is ramped up and back such that the backing pin 46 slides into the bore 58 and away from the surface of the cavity 55 when the driving rod 48 is moved downward in a direction indicated by arrows C.

Figure 2:
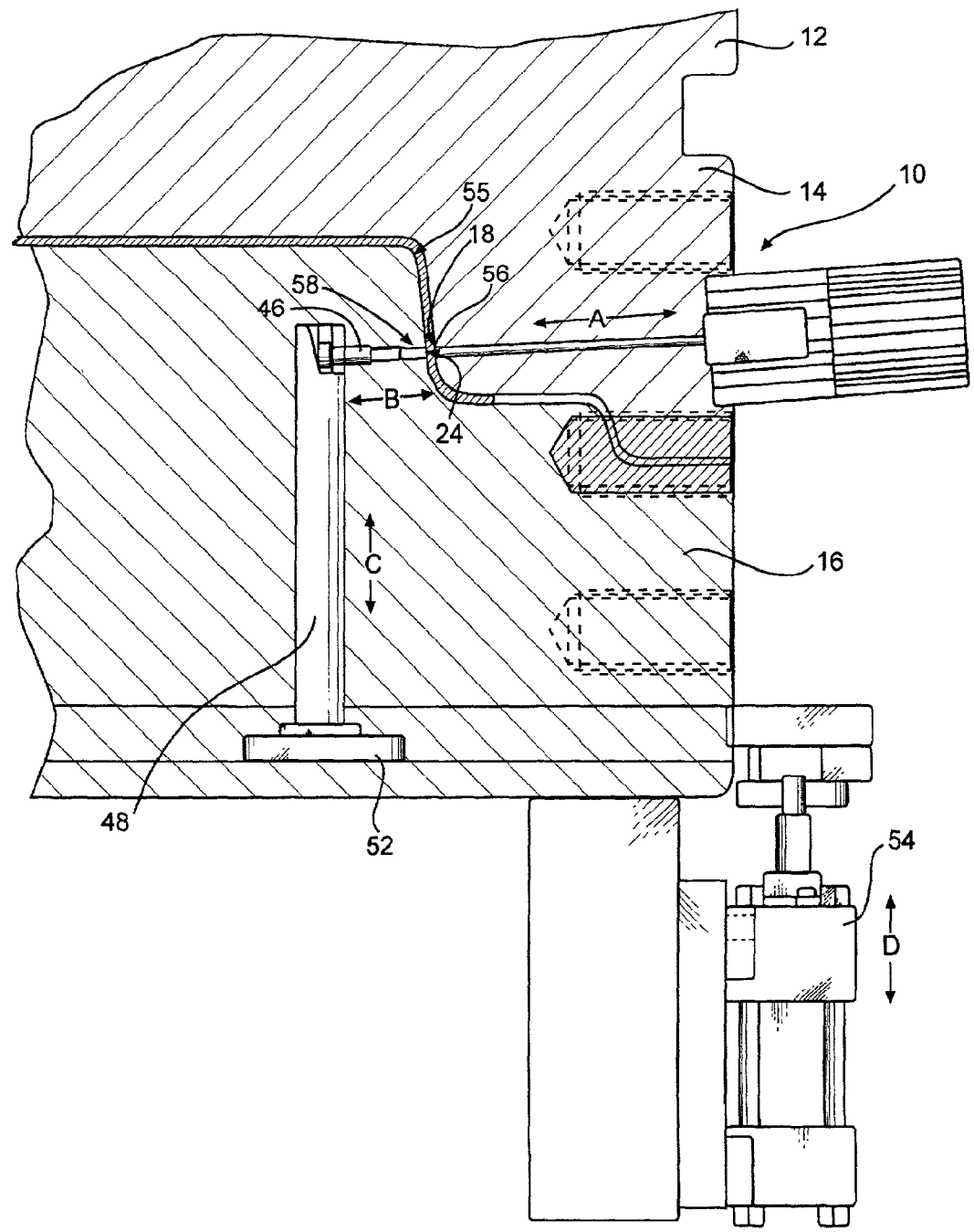
FIG. 2 is a plan view of another embodiment of the hole making mechanism.
Figure 3:
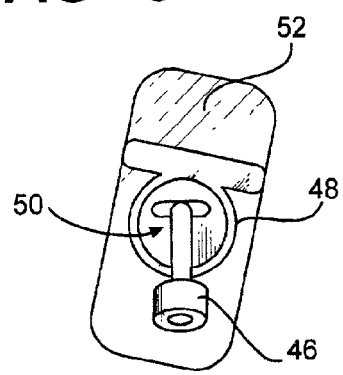
FIG. 3 is a top view of an additional embodiment of the backing pin and driving rod.
Figure 4:
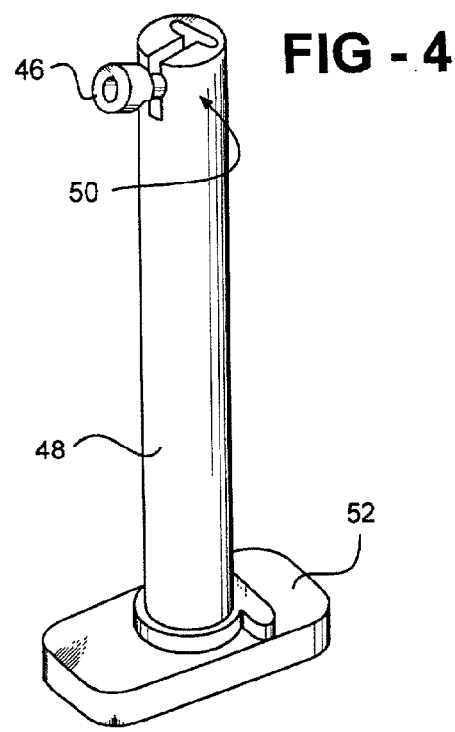
FIG. 4 is a perspective view of the backing pin and driving rod of the additional embodiment.
Figure 5:
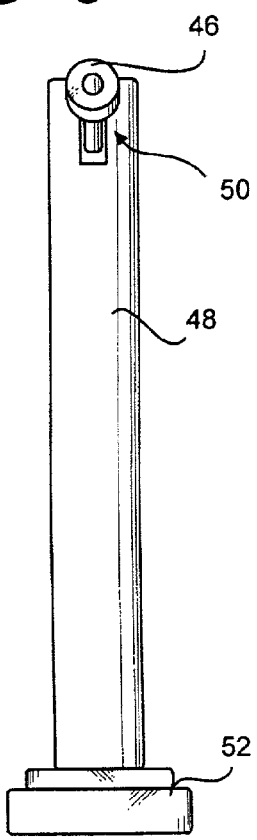
FIG. 5 is a front view of the backing pin and driving rod of the alternate embodiment.
Figure 6:
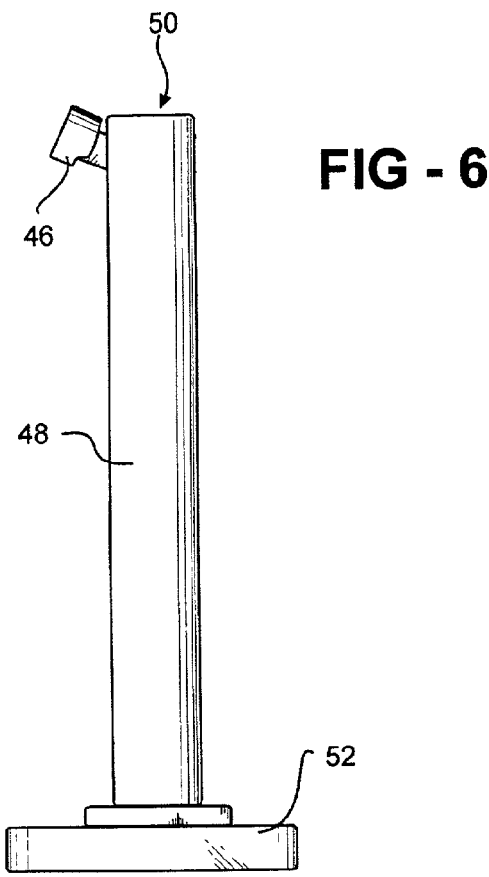
FIG. 6 is a side view of the backing pin and driving rod of the alternate embodiment.

Referring to FIG. 2, the backing rod 46 is attached to a movable plate 52 actuated by a cylinder 54. The cylinder 54 moves the plate 52 downward in a direction D that is common with the first pull direction thereby pulling the driving rod 48 down, which in turn causes the backing pin 46 to be pulled back in the second direction B within the bore 30 and away from the surface of the mold cavity 55.

In operation, the molten plastic material is injected into the mold cavity 56 and solidifies. During the molding process the backing pin 46 is held in place by the driving rod 48 and the punch pin 32 is retracted out of the mold cavity 56. After the injected plastic has solidified into a completed part 18, the cylinder 54 pulls the plate 52 and thereby the driving rod 48 downward in a direction D that is in this case common with the first pull direction of the upper and lower mold sections 14, 16. Downward motion of the driving rod 48 causes the backing pin 46 to ride upward within the keyway 50. The upward movement of the backing pin 46 within the keyway 50 causes movement in the direction indicated by arrows B that retracts the backing pin 46 into the bore 58. This provides space for waste material punched out of the plastic part 18.

The punch pin 32 is then driven through the plastic part 18 by the punch cylinder 34. The material punched out of the plastic part 18 is driven into the bore 30. The punch pin 32 retracts from the mold cavity 56 allowing removal of the completed plastic part 18. The driving rod 48 moves back to the locked position pushing the face 24 of the backing pin 46 flush with the surface of the mold cavity 56.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of forming an opening in a molded plastic part within a mold tool comprising the steps of:
    a. introducing plastic into a mold cavity defined by a first mold part and a second mold part movable relative to each other in a first pull direction to form the plastic part;
    b. locking a backing pin and a punch pin in a locking position such that a face of the backing pin and the punch pin are flush to a surface of the mold cavity during molding of the plastic part;
    c. unlocking the backing pin after said plastic part has solidified; and
    d. driving the punch pin through said solidified plastic part in a second direction different from said first pull direction forming the desired opening.

2. The method of claim 1, further including the step of receiving waste material punched from said plastic part within a bore opposite said punch pin.

3. The method of claim 1, wherein said backing pin slides away from the surface of the mold cavity within the bore to receive the waste material.

4. The method of claim 3, further including retracting the punch pin from said plastic part.

5. The method of claim 4, further including the step of ejecting said plastic part and said waste material from said mold tool.

6. The method as recited in claim 1, wherein the first mold part and the second mold part define a parting line and said first pull direction is normal to said parting line.

7. The method as recited in claim 6, wherein said second direction is substantially transverse to said first pull direction.

8. The method as recited in claim 6, wherein the surface of the mold cavity comprises a surface on a plane that is not perpendicular to said first pull direction, and said second direction is normal to said surface on a plane not perpendicular to said first pull direction.

9. A method of forming an opening in a molded plastic article within a mold tool comprising the steps of:
    a) introducing plastic material in a molten state into a mold cavity defined by a first mold part and a second mold part, wherein an interface between said first mold part and said second mold part defines a parting line;

b) solidifying the plastic material to form the plastic article;

c) unlocking a backing pin only after said plastic material has solidified; and d) driving a punch pin through the solidified plastic article in a direction not normal to said parting line to form a desired opening.

10. The method as recited in claim 9, comprising the step of locking the backing pin and the punch pin in a position prior to introducing plastic material into the mold cavity such that a face of the punch pin and the backing pin form a portion of the mold cavity.

11. The method as recited in claim 9, wherein said backing pin moves away from a surface of the mold cavity to receive waste material removed to form said opening in the plastic article.

12. The method as recited in claim 9, comprising the step of opening the mold tool for removing the plastic article, and said driving step occurs prior to said steps of opening the mold tool.

13. The method as recited in claim 9, wherein said mold cavity includes a surface disposed on a plane not parallel with said parting line and said punch pin and said backing pin includes a face movable normal to said surface.

14. The method as recited in claim 9, wherein said parting line is disposed substantially perpendicular to a first pull direction between said first mold part and said second mold part, and said punch pin and said backing pin move in a second direction different than said first pull direction.

15. A method of forming an opening in a molded plastic article within a mold tool comprising the steps of:

a) introducing a plastic material into a cavity defined by at least a first mold part and a second mold part through an inlet channel;

b) locking a backing pin and a punch pin in place such that a face surface of each of the backing pin and the punch pin is flush with a surface of the cavity;

c) solidifying the plastic material to form the plastic article;

d) unlocking the backing pin spaced apart from said inlet channel; and e) driving the punch pin through the solidified plastic article, wherein said punch pin is disposed within said mold on an opposite side of said backing pin spaced apart from said inlet channel, wherein the at least first mold part and second mold part separate from each other along a pull axis that is different from the axis of movement of the punch pin.

16. The method as recited in claim 15 wherein said backing pin and said punch pin move axially along a common axis.

* * * * *